United States Patent
Brenner et al.

(10) Patent No.: US 9,992,614 B2
(45) Date of Patent: *Jun. 5, 2018

(54) WIRELESS DEVICE PAIRING MANAGEMENT

(71) Applicant: eBay Inc., San Jose, CA (US)

(72) Inventors: Jennifer T. Brenner, Austin, TX (US); Christopher Diebold O'Toole, Cedar Park, TX (US); Bryant Genepang Luk, Round Rock, TX (US); Jason Ziaja, Cedar Park, TX (US); Ananya Das, Austin, TX (US); Robert He, Pflugerville, TX (US)

(73) Assignee: EBAY INC., San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/238,519

(22) Filed: Aug. 16, 2016

(65) Prior Publication Data

US 2016/0360353 A1    Dec. 8, 2016

Related U.S. Application Data

(63) Continuation of application No. 14/717,436, filed on May 20, 2015, now Pat. No. 9,451,391.

(51) Int. Cl.
*H04W 4/00* (2018.01)
*H04W 40/24* (2009.01)
(Continued)

(52) U.S. Cl.
CPC ............. *H04W 4/008* (2013.01); *H04W 4/04* (2013.01); *H04W 8/005* (2013.01);
(Continued)

(58) Field of Classification Search
CPC ........ H04B 2201/71346; H04W 4/008; H04W 72/10; H04W 72/1247; H04W 74/0875; H04W 68/04

See application file for complete search history.

(56) References Cited

U.S. PATENT DOCUMENTS 8,104,066 B2   1/2012   Colsey et al.
8,295,766 B2   10/2012  Zimbric et al.
(Continued)

OTHER PUBLICATIONS

International Search Report, as issued in connection with International Patent Application No. PCT/US16/32923, dated Sep. 16, 2016, 2 pgs.

(Continued)

*Primary Examiner* — Andrew Wendell
(74) *Attorney, Agent, or Firm* — Maschoff Brennan (57) ABSTRACT

A method may include detecting a first wireless device configured to perform short-range wireless communications and detecting a second wireless device configured to perform short-range wireless communications. The method may also include determining one or more short-range wireless connection priorities with respect to a first pairing and a second pairing. The first pairing may be with respect to short-range wireless communications between the first wireless device and a third wireless device configured to perform short-range wireless communications. The second pairing may be with respect to short-range wireless communications between the second wireless device and the third wireless device. The method may further include managing the first pairing and the second pairing based on the one or more short-range wireless connection priorities.

20 Claims, 4 Drawing Sheets

(51) Int. Cl.
  *H04W 8/00* (2009.01)
  *H04W 4/04* (2009.01)
  *H04W 76/02* (2009.01)
  *H04W 84/18* (2009.01)
  *H04W 88/02* (2009.01)

(52) U.S. Cl.
  CPC ....... *H04W 40/246* (2013.01); *H04W 76/021* (2013.01); *H04W 84/18* (2013.01); *H04W 88/02* (2013.01)

(56) References Cited

U.S. PATENT DOCUMENTS

| | | |
|---|---|---|
| 8,732,319 B2 | 5/2014 | Tian |
| 8,806,023 B2 | 8/2014 | Desai et al. |
| 8,938,394 B1 | 1/2015 | Faaborg et al. |
| 9,154,218 B2 | 10/2015 | Cha |
| 9,451,391 B1 * | 9/2016 | Brenner ............... H04W 4/008 |
| 2004/0085981 A1 | 5/2004 | Lee et al. |
| 2004/0166883 A1 | 8/2004 | Kim et al. |
| 2006/0229014 A1 | 10/2006 | Harada et al. |
| 2006/0270348 A1 | 11/2006 | Ilbrahim et al. |
| 2007/0238475 A1 | 10/2007 | Goedken |
| 2008/0057868 A1 | 3/2008 | Chang |
| 2010/0115146 A1 | 5/2010 | Roth et al. |
| 2010/0279612 A1 | 11/2010 | Harwood et al. |
| 2011/0294466 A1 | 12/2011 | Tang et al. |
| 2014/0057563 A1 | 2/2014 | Salahshoor |
| 2014/0087665 A1 | 3/2014 | Yang |
| 2014/0153757 A1 | 6/2014 | Ku et al. |
| 2014/0351901 A1 | 11/2014 | Sangster et al. |
| 2015/0052467 A1 | 2/2015 | Kim et al. |
| 2015/0105018 A1 | 4/2015 | Elzein |
| 2015/0116109 A1 | 4/2015 | Fadell et al. |

OTHER PUBLICATIONS

International Written Opinion, as issued in connection with International Patent Application No. PCT/US16/32923, dated Sep. 16, 2016, 7 pgs.

* cited by examiner

WIRELESS DEVICE PAIRING MANAGEMENT

CROSS-REFERENCE TO RELATED APPLICATION

This application is a continuation of U.S. patent application Ser. No. 14/717,436, filed May 20, 2015, which is incorporated herein by reference in its entirety.

FIELD

The embodiments discussed in the present disclosure are related to wireless device pairing management.

BRIEF DESCRIPTION OF THE DRAWINGS

Example embodiments will be described and explained with additional specificity and detail through the use of the accompanying drawings in which.

DESCRIPTION OF EMBODIMENTS

As detailed below, in the present disclosure, reference is made to "short-range wireless communications." The use of the term "short-range wireless communications" may refer to wireless communications and protocols that may allow devices to establish wireless connections for communication with other wireless devices over a relatively small range (e.g., approximately less than 20 meters). Examples of commonly used short-range wireless communications are Bluetooth Class 2 and Class 3 communications with protocols that are managed by the Bluetooth Special Interest Group (SIG) and that have ranges of approximately ten meters and one meter, respectively. Examples of wireless communications that may not be considered "short-range" wireless communications in the present disclosure include wireless communications performed under the IEEE 802.11 protocol (commonly referred to as WiFi®) and wireless communications performed with respect to cellular type communications.

Further, wireless devices that are enabled with short-range wireless communication capabilities may be referred to as "short-range devices" in the present disclosure. Additionally, wireless devices that are specifically enabled with Bluetooth communication capabilities may be referred to as "Bluetooth devices."

Moreover, use of the term "pairing" in the present disclosure may refer to the establishment or presence of a short-range wireless connection between two short-range devices. Also, the term "pairing" in the present disclosure may include the establishment or presence of a direct short-range wireless connection between respective short-range devices or may include the establishment or presence of an indirect short-range wireless connection between respective short-range devices in which one or more other short-range wireless devices may relay short-range wireless communications between the short-range devices that may correspond to a particular pairing. Further, a particular short-range device may be paired (directly or indirectly) with more than one other short-range device at any particular time.

The number of short-range devices has increased substantially in recent years. For example, the number of Bluetooth devices such as smartphones, speakers, headphones, keyboards, mice, etc. has steadily grown in the past years. As such, in many instances, the number of possible short-range devices with which a particular short-range device may be paired (e.g., establish a Bluetooth connection) may be greater than one. In many of these instances, a user may have to manually pair or unpair sets of short-range devices to obtain a target pairing.

Therefore, according to one or more embodiments of the present disclosure one or more connection priorities may be determined with respect to pairings of different short-range devices. Additionally or alternatively, the pairings between the short-range devices may be managed based on the connection priorities in a manner that reduces or eliminates a user having to manually pair or unpair sets of short-range devices to obtain a target pairing.

Figure 1:
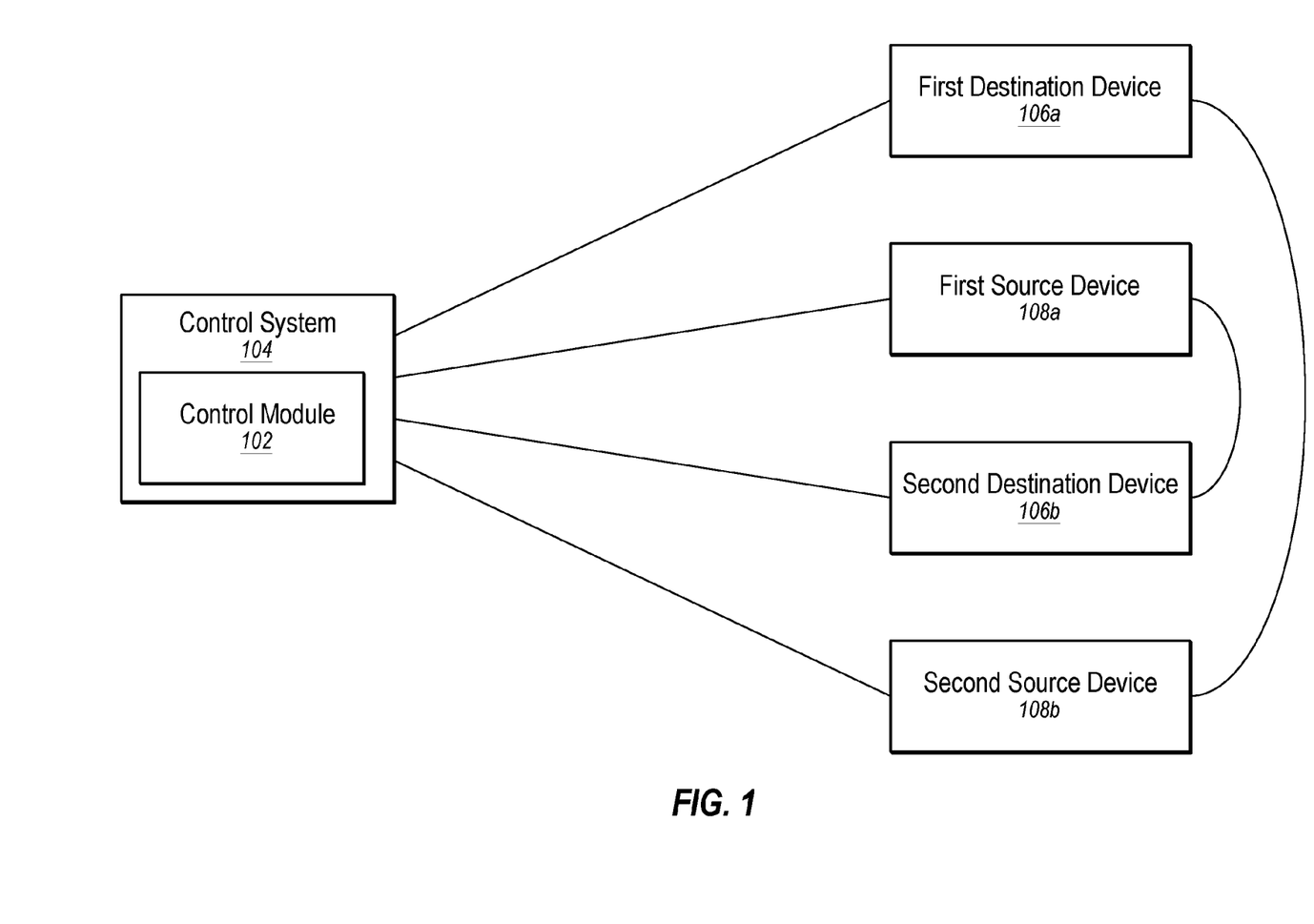
FIG. 1 illustrates a block diagram of an example system configured to manage wireless device pairings.

Turning to the figures, FIG. 1 illustrates an example system 100 configured to manage pairings of short-range devices, according to at least one embodiment described in the present disclosure. The system 100 may include a control system 104, a first destination device 106a, a first source device 108a, a second destination device 106b, and a second source device 108b.

The destination devices 106 and the source devices 108 may include short-range devices such that they may be configured to perform short-range wireless communications with one or more other short-range devices. Additionally or alternatively, in some embodiments, the control system 104 may include a short-range device such that the control system 104 may be configured to perform short-range wireless communications with one or more other short-range devices also.

The destination devices 106 may include any suitable short-range device that may be configured to pair with a short-range device in a manner in which information may be primarily received by the destination devices 106 over a respective short-range wireless connection via a respective short-range wireless communication. Examples of the destination devices 106 may include a speaker, headphones, an automobile control module, a tablet computer, a smartphone, a laptop computer, a desktop computer, etc.

The source devices 108 may include any suitable short-range device that may be configured to pair with a short-range device in a manner in which information may be primarily transmitted by the source devices 108 over a respective short-range wireless connection via a respective short-range wireless communication. Examples of the source devices 108 may include a tablet computer, a smartphone, a laptop computer, a desktop computer, a music player, a video player, etc.

In the illustrated example, the first destination device 106a may be configured to pair with the first source device 108a or the second source device 108b. Additionally, the first destination device 106a may be configured to pair with both the first source device 108a and the second source device 108b at the same time or at different times. Additionally or alternatively, the second destination device 106b may be configured to pair with the second source device 108a or the first source device 108a. Additionally, the second destination device 106b may be configured to pair with both the first source device 108a and the second source device 108b at the same time or at different times.

The terms "destination device" and "source device" are used to describe short-range devices with respect to operations that may be performed with respect to a particular pairing and are not mutually exclusive terms with respect to any particular short-range device. In some instances, a short-range device may be considered a source device with respect to a particular pairing and may be considered a destination device with respect to another pairing. For example, in some instances, a tablet computer may be paired with a speaker in which the speaker may play music based on communications received from the tablet computer via a respective short-range connection. Additionally, the tablet computer may also be paired with a keyboard in which the tablet computer may receive instructions from the keyboard via the respective short-range connection. The tablet computer may be considered a source device with respect to the pairing with the speaker and the tablet computer may be considered a destination device with respect to the pairing with the keyboard.

The control system 104 may include any suitable system, apparatus, or device that may be configured to manage pairings between the destination devices 106 and the source devices 108 via a control module 102. For example, the control system 104 may include a server, a laptop computer, a desktop computer, a smartphone, a standalone device specifically configured to perform the respective operations, etc. Although illustrated separately, in some embodiments, the control system 104 may be included in one or more of the destination devices 106 or the source devices 108. Further, in some embodiments, the control system 104 may be implemented as a computing system such as that described below with respect to FIG. 2.

In some embodiments, the control module 102 may include code and routines configured to enable the control system 104 to manage the pairings of the destination devices 106 with the source devices 108. Additionally or alternatively, the control module 102 may be implemented using hardware including a processor, a microprocessor (e.g., to perform or control performance of one or more operations), a field-programmable gate array (FPGA), or an application-specific integrated circuit (ASIC). In some other instances, the control module 102 may be implemented using a combination of hardware and software. In some embodiments, the control module 102 may be an example of a control means for managing pairings of short-range devices. In the present disclosure, operations described as being performed by the control module 102 may include operations that the control module 102 may direct the control system 104 to perform.

In some embodiments, the control module 102 may be configured to determine one or more short-range wireless connection priorities for pairings between the destination devices 106 and the source devices 108. For example, the control module 102 may be configured to determine one or more connection priorities with respect to a first pairing between the first destination device 106a and the first source device 108a, a second pairing between the first destination device 106a and the second source device 108b, a third pairing between the second destination device 106b and the first source device 108a, and a fourth pairing between the second destination device 106b and the second source device 108b.

The control module 102 may be configured to determine the short-range wireless connection priorities based on device types of the source devices 108 and of the destination devices 106 in some embodiments. The device types may include a smartphone type, a tablet computer type, a keyboard type, a mouse type, a music player type, a video player type, a desktop computer type, an automobile control module type, a speaker type, a headphones type, etc.

An example short-range wireless connection priority based on type may include a smartphone having a higher short-range wireless connection priority with an automobile control module than a music player because the smartphone may be able to direct both calls and music through the automobile control module via a respective pairing whereas the music player may not be able to direct calls through the automobile control module. Another example short-range wireless connection priority based on type may include a tablet computer having a higher short-range wireless connection priority with a keyboard than a smartphone because the keyboard may be more likely to be used with the tablet computer than with the smartphone.

As another example, a speaker may have a higher or lower short-range wireless connection priority than headphones depending on the device type of the associated source device with which the pairing may be made. For instance, the speaker may have a higher short-range wireless connection priority than headphones with respect to pairing with a laptop computer but may have a lower short-range wireless connection priority than the headphones with respect to pairing with a smartphone. The example short-range wireless connection priorities and associated reasons given with respect to device type are not limiting and merely given for illustrative purposes.

Additionally or alternatively, the control module 102 may be configured to determine the short-range wireless connection priorities based on type of use of the source devices 108 with respect to their respective possible pairings and type of use of the destination devices 106 with respect to their respective possible pairings. The types of uses of source devices 108 and the destination devices 106 with respect to their possible pairings may include music streaming, video streaming, phone calls, keyboard instructions, mouse instructions, etc.

For example, the first source device 108a may include a first smartphone running a music playing application and the second source device 108b may include a second smartphone in a standby mode. Further, the first destination device 106a may include an automobile control module in an audio receiving mode via short-range communications (e.g., in an audio receiving mode via Bluetooth). The control module 102 may prioritize the first pairing between the first source device 108a and the first destination device 106a over the second pairing between the second source device 108b and the first destination device 106a based on the use of the first source device 108a of running the music playing application, the use of the second source device 108b being in standby mode, and the automobile control module being in the audio receiving mode.

As another example, the first source device 108a may include the first smartphone running the music playing application and the second source device 108b may include the second smartphone receiving a phone call. Further, the first destination device 106a may include the automobile control module. The control module 102 may prioritize the second pairing between the second source device 108b and the first destination device 106a over the first pairing between the first source device 108a and the first destination device 106a based on the use of the second source device 108b of receiving the call.

In yet another example, the first source device 108a may include a keyboard and the second source device 108b may include a first tablet computer running a music playing application. Further, the first destination device 106a may include headphones and the second destination device 106b may include a second table computer running an email application. The control module 102 may prioritize the third pairing between the first source device 108a and the second destination device 106b over other pairings with respect to the first source device 108a or the second destination device 106b (e.g., over the first and fourth pairings) based on the use of the email application by the second destination device 106b. Additionally or alternatively, the control module 102 may prioritize the second pairing between the second source device 108b and the first destination device 106a over other pairings with respect to the second source device 108b or the first destination device 106a (e.g., over the first and fourth pairings) based on the use of the second source device 108b of running the music playing application.

In another example, the first source device 108a may include the first smartphone, the first destination device 106a may include a calling headset, and the second destination device 106b may include a speaker. During a first moment of time, the first source device 108a may be running a music playing application and during a second moment of time, the first source device 108a may be receiving a phone call. In some embodiments, the control module 102 may prioritize the third pairing of the first source device 108a with the second destination device 106b over the first pairing of the first source device 108a with the first destination device 106a during the first moment of time based on the running of the music playing application during the first moment of time. Additionally or alternatively, the control module 102 may prioritize the first pairing of the first source device 108a with the first destination device 106a over the third pairing of the first source device 108a with the second destination device 106b during the second moment of time based on the phone call that may be occurring during the second moment of time. The example short-range wireless connection priorities and associated reasons given with respect to use are not limiting and are merely given for illustrative purposes.

Additionally or alternatively, the control module 102 may be configured to determine the short-range wireless connection priorities based on context of use of the source devices 108 and context of use of the destination devices 106. The context of uses of source devices 108 and the destination devices 106 may include ownership of the source devices 108 and the destination devices 106 and locations of the destination devices 106 and the source devices 108 with respect to each other.

For example, the first source device 108a and the first destination device 106a may be owned by a first user and the second source device 108b and the second destination device 106b may be owned by a second user. Based on this ownership, the control module 102 may be configured to prioritize the first pairing of the first source device 108a with the first destination device 106a over the third pairing of the first source device 108a with the second destination device 106b. Similarly, the control module 102 may be configured to prioritize the fourth pairing of the second source device 108b with the second destination device 106b over the second pairing of the second source device 108b with the first destination device 106a based on the ownership.

As another example, the first source device 108a may be a first distance away from the first destination device 106a and may be a second distance away from the second destination device 106b. The first distance may be greater than the second distance. The control module 102 may be configured to determine at least an estimate of the first and second distances (e.g., based on received signal strengths of wireless signals). Based on the first distance being smaller than the second distance, the control module 102 may be configured to prioritize the first pairing of the first source device 108a with the first destination device 106a over the third pairing of the first source device 108a with the second destination device 106b. Additionally, the second source device 108b may be a third distance away from the first destination device 106a that may be less than the first distance. The control module 102 may be configured to also at least estimate the third distance and compare it with the first distance. Based on the comparison indicating that the third distance may be less than the first distance, the control module 102 may prioritize the second pairing of the second source device 108b with the first destination device 106a over the first pairing of the first source device 108a with the first destination device 106a.

The example short-range wireless connection priorities and associated reasons given with respect to context of use of the source devices 108 and the destination devices 106 are not limiting and are merely given for illustrative purposes.

In these or other embodiments, the control module 102 may be configured to determine the short-range wireless connection priorities based on privacy considerations. The privacy considerations may include whether or not other people may listen to a conversation, music being listened to, videos being watched, etc.

By way of example, the first source device 108a may include a first smartphone of a first user, the second source device 108b may include a second smartphone of a second user and the first destination device 106a may include an automobile control system of an automobile that may be owned by the first user. The control module 102 may be configured to determine that both the first user and the second user are in the automobile (e.g., based on any suitable a location determination of the first source device 108a, the second source device 108b, and the first destination device 106a). Based on this determination, the control module 102 may be configured to place a relatively low short-range wireless connection priority of pairing the first source device 108a or the second source device 108b with the first destination device 106a with respect to phone calls because of privacy considerations.

Additionally or alternatively, the control module 102 may be configured to listen to a conversation that may be ongoing via the first pairing between the first source device 108a and the first destination device 106a and may listen for one or more keywords that may indicate that the conversation may be private. In response to detecting one or more of the keywords, the control module 102 may be configured to change a short-range wireless connection priority that may indicate that the first pairing between the first source device 108a and the first destination device 106a may be terminated.

The example short-range wireless connection priorities and associated reasons given with respect to privacy considerations are not limiting and are merely given for illustrative purposes.

Additionally or alternatively, the control module 102 may be configured to determine the short-range wireless connection priorities based on pairing histories of the source devices 108 and the destination devices 106. The pairing histories may include histories of manual pairings that may be made by users of the source devices 108 and the destination devices 106. Additionally or alternatively, the pairing histories may include times when a pairing prioritization that may be determined by the control module 102 may be overridden by a user. In some embodiments, the manual pairings or overrides by the users that may be included in the pairing histories may be given a higher priority than other possible wireless connections when determining the short-range wireless connection priorities.

By way of example, a pairing history may indicate that the user consistently pairs the first destination device 106a with the first source device 108a. As such, the control module 102 may be configured to give the first pairing a relatively high priority in a respective short-range wireless connection priority based on this pairing history. Additionally or alternatively, the pairing history may indicate that when the first destination device 106a and the second source device 108b are paired, the user consistently unpairs them. As such, the control module 102 may be configured to give the second pairing a relatively low priority in a respective short-range wireless connection priority based on this pairing history.

The example short-range wireless connection priorities and associated reasons given with respect to pairing histories are not limiting and are merely given for illustrative purposes.

Although the different factors that may be used by the control module 102 to determine the short-range wireless connection priorities are discussed separately above with separate examples, the control module 102 may determine the short-range wireless connection priorities using one or more of the factors and any combination thereof. Further, in some embodiments, control module 102 may be configured to monitor the factors that may be used to determine the short-range wireless connection priorities and may change the short-range wireless connection priorities based on one or more changes in one or more of the factors. As such, the short-range wireless connection priorities may be dynamically altered such that the pairings may be dynamically altered.

Moreover, in some instances some factors may conflict with respect to determining the short-range wireless connection priorities. As such, in some embodiments some factors used in determining the short-range wireless connection priorities may be given greater weight than others. For example, in some embodiments, the weighting of factors from greatest weight to least weight may be listed as privacy considerations, pairing history, type of use of the devices, type of devices, locations of the devices, and ownership of the devices.

For example, the first source device 108a may include a first smartphone of a first user, the second source device 108b may include a second smartphone of a second user, and the first destination device 106a may include an automobile control system of an automobile that may be owned by the first user. Therefore, based on ownership, the short-range wireless connection priority may favor the first pairing of the first source device 108a with the first destination device 106a over the second pairing of the second source device 108b with the first destination device 106a. However, distance determinations may indicate that the second source device 108b may be a relatively small distance away from the first destination device 106a and that the first source device 108a may be a relatively large distance away from the first destination device 106a. Based on the example weighting, the control module 102 may factor in distance more than ownership such that the short-range wireless connection priority may prioritize the second pairing of the second source device 108b with the first destination device 106a over the first pairing of the first source device 108a with the first destination device 106a.

The example weighting of the factors and associated reasons given with respect to the short-range wireless connection priorities are not limiting and are merely given for illustrative purposes.

The control module 102 may be configured to manage pairings between the destination devices 106 and the source devices 108 based on the short-range wireless connection priorities. For example, a particular short-range wireless connection priority may indicate that the first and fourth pairings have higher priority than the second and third pairings. As such, the control module 102 may manage the pairings such that the first and fourth pairings may be established and maintained instead of the second and third pairings.

Additionally, as mentioned above, in some embodiments, the short-range wireless connection priorities may be dynamically altered based on changing circumstances. In these and other embodiments, the control module may manage and alter the pairings according to the changes in the circumstances. For example, during a moment in time the first pairing may have a higher priority than the second pairing. But applicable circumstances may change such that the second pairing may have a higher priority than the first pairing at a later time. The control module 102 may accordingly manage the pairings such that the first source device 108a and the first destination device 106a are paired during the moment of time and may also manage the pairings such that the second source device 108b and the first destination device 106a are paired at the later time in response to the changing circumstances.

In some embodiments, the control module 102 may be configured to manage the pairings by directing the control system 104 to relay short-range wireless communications between the respective destination device 106 and source device 108. For example, to manage the first pairing, the control system 104 may pair itself with the first destination device 106a and the first source device 108a. The control system 104 may receive information from the first source device 108a via a short-range wireless connection associated with its pairing with the first source device 108a. The control system 104 may relay the information received from the first source device 108a to the first destination device 106a via another short-range wireless connection associated with its pairing with the first destination device 106a. As indicated above, the pairing of the control system 104 and the relaying of information by the control system 104 may be performed in response to one or more instructions of the control module 102 in some embodiments.

In these or other embodiments, the control module 102 may be configured to alter the pairings by altering the relaying. For example, a particular short-range wireless connection priority may change from prioritizing the first pairing to prioritizing the second pairing. The control module 102 may accordingly be configured to relay information from the second source device 108b to the first destination device 106a (e.g., via respective pairings of the control system 104 with the second source device 108b and the first destination device 106a) instead of relaying information from the first source device 108a to the first destination device 106a.

Additionally or alternatively, the control module 102 may be configured to manage the pairings by directing the respective destination devices 106 to pair with the respective source devices 108 indicated by the short-range wireless connection priorities. In these or other embodiments, the control module 102 may be configured to direct handoffs of pairings in response to changes in the short-range wireless connection priorities.

By way of example, in some embodiments, the control module 102 may direct operations associated with the control system 104 communicatively coupling to the destination devices 106 and the source devices 108. In some embodiments, the control system 104 may be communicatively coupled to one or more of the destination devices 106 and the source devices 108 via a same type of short-range wireless communication (e.g., Bluetooth) as that which may be used to pair the respective source devices 108 and destination devices. In these or other embodiments, the control system 104 may be communicatively coupled to one or more of the destination devices 106 and the source devices 108 via a different type of short-range wireless communication as that which may be used to pair the respective source devices 108 and destination devices. Additionally or alternatively, the control system 104 may be communicatively coupled to one or more of the destination devices 106 and the source devices 108 via wireless communications that may not necessarily fall under a short-range wireless communication protocol, such as via a WiFi or cellular type of connection.

The control module 102 may be configured to communicate with the source devices 108 and the destination devices 106 via the communicative couplings of the control system 104 with the source devices 108 and the destination devices 106. In some embodiments, the control module 102 may direct the source devices 108 and the destination devices 106 to establish or maintain pairings via communications over the communicative couplings. Additionally or alternatively, the control module 102 may direct the pairings based on the short-range wireless connection priorities.

For instance, a particular short-range wireless connection priority may indicate that the first pairing has priority over the second pairing. Based on the particular short-range wireless connection priority, the control module 102 may be configured to communicate instructions to the first destination device 106*a* and the first source device 108*a* that direct the first destination device 106*a* and the first source device 108*a* to pair with each other. Additionally or alternatively, the control module 102 may be configured to communicate instructions to the first destination device 106*a* and the second source device 108*b* not to pair with each other based on the particular connection priority.

In these or other embodiments, the particular short-range wireless connection priority may change such that the second pairing may be prioritized over the first pairing. Based on the change to particular short-range wireless connection priority, the control module 102 may be configured to direct the first destination device 106*a* and the first source device 108*a* to unpair and may direct the first destination device 106*a* and the second source device 108*b* to pair with each other.

Accordingly, the system 100 may be configured to manage pairings of short-range devices. Modifications, additions, or omissions may be made to the system 100 without departing from the scope of the present disclosure. For example, the operations described as being performed by specific elements of the system 100 may be performed by one or more different elements of the system 100. As another example, as indicated above, in some embodiments one or more of the destinations devices 106 or the source devices 108 may include the control system 104. Further, one or more of the operations may be performed in a distributed manner across one or more of the elements. In addition, the system 100 may include more or fewer elements than those explicitly listed or described.

Figure 2:
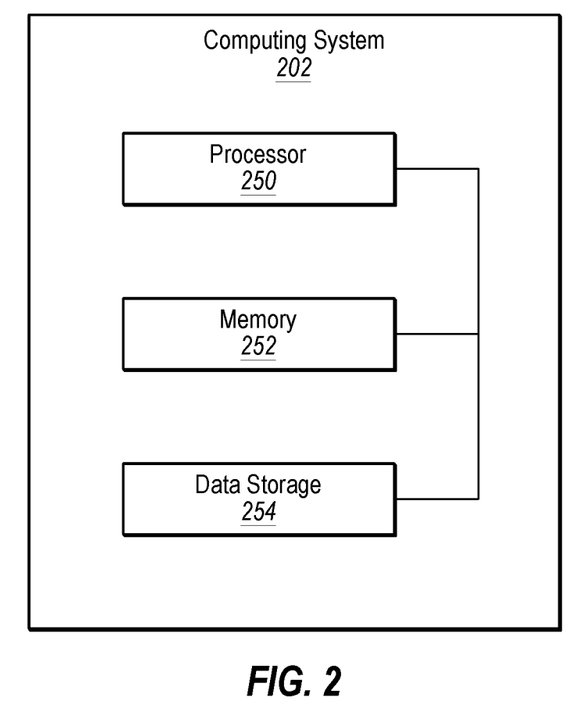
FIG. 2 illustrates a block diagram of an example computing system.

FIG. 2 illustrates a block diagram of an example computing system 202, according to at least one embodiment of the present disclosure. The computing system 202 may be an example implementation of the control system 104 of FIG. 1 and in some embodiments may be configured to implement one or more operations associated with the control module 102 of FIG. 1. The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to perform, individually or collectively, any number of operations described in the present disclosure. Additionally, one or more of the processors may be present on one or more different electronic devices, such as different servers.

In some embodiments, the processor 250 may interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, the control module 102 of FIG. 1 may be included in the data storage 254 as program instructions. The processor 250 may fetch the program instructions of the analysis module from the data storage 254 and may load the program instructions of the analysis module in the memory 252. After the program instructions of the analysis module are loaded into memory 252, the processor 250 may execute the program instructions such that the computing system may implement the operations associated with the analysis module as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250.

By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

As mentioned above, in some embodiments, the control module 102 of FIG. 1 may be an example of a control means for directing operations of a system with respect to wireless device pairing. In some embodiments, the processor 250 may be an example of a processing means for executing the control means to cause a system to perform operations that may be directed by the control means. In these or other embodiments, the memory 252 or the data storage 254 may also be examples of a storage means configured to store instructions of the control means.

Modifications, additions, or omissions may be made to the computing system 202 without departing from the scope of the present disclosure. For example, in some embodiments, the computing system 202 may include any number of other components that may not be explicitly illustrated or described.

Figure 3:
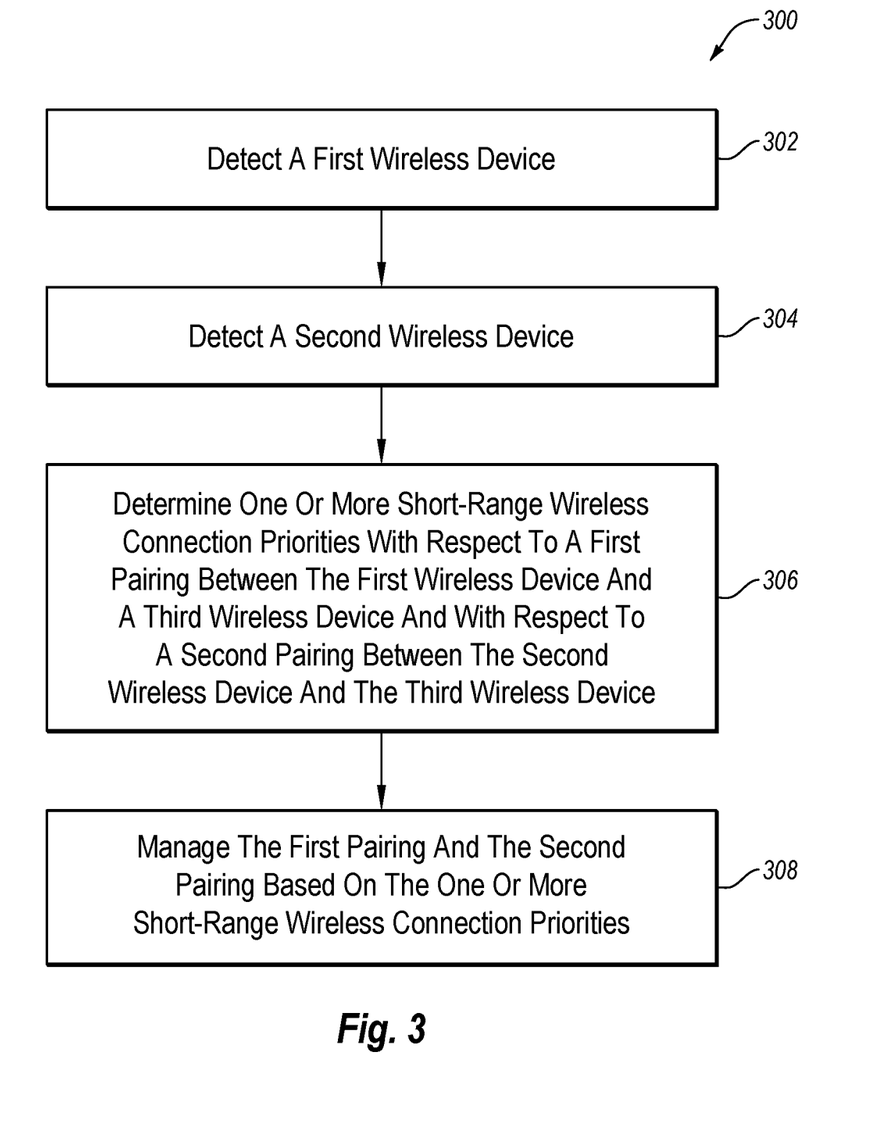
FIG. 3 is a flowchart of an example method to manage wireless device pairings.

FIG. 3 is a flowchart of an example method 300 to manage pairings of wireless devices, according to at least one embodiment described in the present disclosure. The method 300 may be implemented, in some embodiments, by a control system as instructed by a control module, such as the control system 104 and the control module 102 of FIG. 1. Although illustrated as discrete blocks, various blocks may be divided into additional blocks, combined into fewer blocks, or eliminated, depending on the desired implementation.

The method 300 may begin, and at block 302, a first wireless device configured to perform short-range wireless communications may be detected. In some embodiments, the first wireless device may include a source wireless device. In these or other embodiments, the first wireless device may include a destination wireless device.

At block 304, a second wireless device configured to perform short-range wireless communications may be detected. In some embodiments, the second wireless device may include a source wireless device. In these or other embodiments, the second wireless device may include a destination wireless device.

At block 306, one or more short-range wireless connection priorities may be determined with respect to a first pairing and a second pairing. The first pairing may be with respect to short-range wireless communications between the first wireless device and a third wireless device configured to perform short-range wireless communications. Additionally, the second pairing may be with respect to short-range wireless communications between the second wireless device and the third wireless. In some embodiments, the third wireless device may include a source device (e.g., in instances where the first and second wireless devices include destination devices). Additionally or alternatively, the third wireless device may include a destination device (e.g., in instances where the first and second wireless devices include source devices).

In some embodiments, determining the one or more short-range wireless connection priorities may be based on device types of the first wireless device, the second wireless device, and the third wireless device. Additionally or alternatively, determining the one or more short-range wireless connection priorities may be based on types of use of the first wireless device and of the third wireless device with respect to the first pairing and types of use of the second wireless device and of the third wireless device with respect to the second pairing. In these or other embodiments, determining the one or more short-range wireless connection priorities may be based on context of use of the first wireless device; context of use of the second wireless device, and context of use of the third wireless device. Further, in some embodiments, determining the one or more short-range wireless connection priorities may be based on a pairing history with respect to the first pairing and with respect to the second pairing. In these or other embodiments, determining the one or more short-range wireless connection priorities may include determining one or more applications (e.g., music, video, email, etc.) that may be run on the first wireless device, the second wireless device, or the third wireless device.

At block 308, the first pairing and the second pairing and the second pairing may be managed based on the one or more short-range wireless connection priorities. In some embodiments, managing the first pairing and the second pairing may include directing the first wireless device and the third wireless device to perform short-range wireless pairing and short-range wireless unpairing and directing the second wireless device and the third wireless device to perform short-range wireless pairing and short-range wireless unpairing. Additionally or alternatively, managing the first pairing and the second pairing may include performing relaying operations of short-range wireless communications between the first wireless device and the third wireless device and performing relaying operations of short-range wireless communications between the second wireless device and the third wireless device.

Modifications, additions, or omissions may be made to the method 300 without departing from the scope of the present disclosure. For example, the functions and operations described with respect to the method 300 may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 300 may further include detecting the third wireless device. In some instances, the further operation of detecting the third wireless device may occur with respect to a control system and corresponding control module not being included in the third wireless device. Alternatively, in some instances, the control system and corresponding control module may be included in the third wireless device such that detecting the third wireless device may be omitted in some embodiments.

In addition, in some embodiments, the short-range wireless communications, connections, pairings, and protocols may include Bluetooth communications, connections, pairings, and protocols. In these or other embodiments, one or more of the short-range wireless communications, connections, pairings, and protocols may include other communications, connections, pairings, and protocols than Bluetooth.

Figure 4:
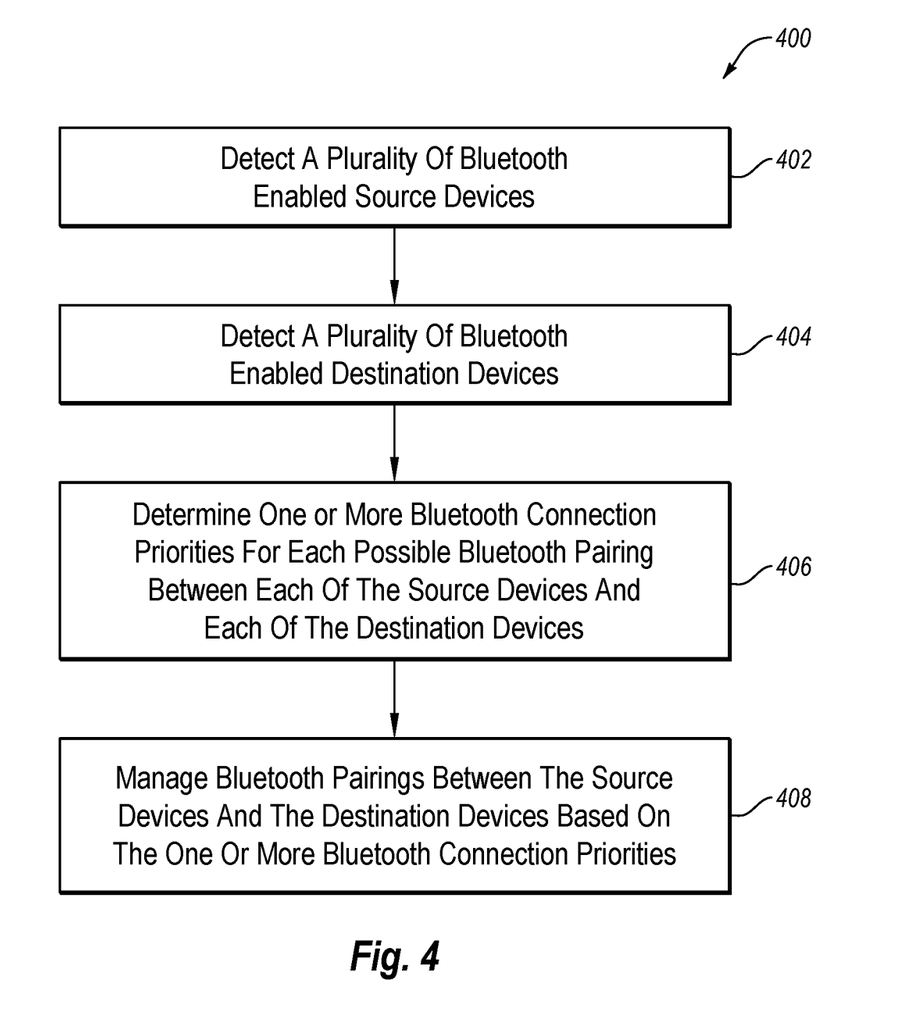
FIG. 4 is a flowchart of another example method to manage wireless device pairings.

FIG. 4 is a flowchart of another example method 400 to manage pairings of wireless devices, according to at least one embodiment described in the present disclosure. The method 400 may be implemented, in some embodiments, by a control system as instructed by a control module, such as the control system 104 and the control module 102 of FIG. 1. Although illustrated as discrete blocks, various blocks of method 400 may be divided into additional blocks, combined into fewer blocks, or eliminated, depending on the desired implementation.

The method 400 may begin, and at block 402, multiple source wireless devices configured to perform short-range wireless communications may be detected. In some embodiments, the source wireless devices may include Bluetooth enabled devices.

At block 404, multiple destination wireless devices configured to perform short-range wireless communications may be detected. In some embodiments, the destination wireless devices may include Bluetooth enabled devices.

At block 406, one or more short-range wireless connection priorities may be determined with respect to each possible short-range wireless pairing between each of the source wireless devices and each of the destination wireless devices. In some embodiments, the one or more short-range connection priorities may include one or more Bluetooth connection priorities.

In some embodiments, determining the one or more short-range wireless connection priorities may be based on device types of the source wireless devices and of the destination wireless devices. Additionally or alternatively, determining the one or more short-range wireless connection priorities may be based on types of use of the source wireless devices and of the destination wireless devices with respect to the possible pairings. In these or other embodiments, determining the one or more short-range wireless connection priorities may be based on context of use of the source wireless devices and of the destination wireless devices. Further, in some embodiments, determining the one or more short-range wireless connection priorities may be based on a pairing history of the source wireless devices with respect to pairing with the destination wireless devices. In these or other embodiments, determining the one or more short-range wireless connection priorities may include determining one or more applications (e.g., music, video, email, etc.) that may be run on the source wireless devices or the destination wireless devices.

At block 408, short-range wireless pairings between one or more of the source wireless devices and one or more of the destination wireless devices may be managed based on the one or more short-range wireless connection priorities. In some embodiments, managing the short-range wireless pairings may include directing the source wireless devices and the destination wireless devices to perform short-range wireless pairing and unpairing. Additionally or alternatively managing the short-range wireless pairings may include performing relaying operations of short-range wireless communications between a respective destination wireless device and a respective source wireless device associated with a respective short-range wireless connection pairing.

Modifications, additions, or omissions may be made to the method 400 without departing from the scope of the present disclosure. For example, the functions and operations described with respect to the method 400 may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In addition, in some embodiments, the short-range wireless communications, connections, pairings, and protocols may include Bluetooth communications, connections, pairings, and protocols. In these or other embodiments, one or more of the short-range wireless communications, connections, pairings, and protocols may include other communications, connections, pairings, and protocols than Bluetooth.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 of FIG. 2) for carrying or having computer-executable instructions or data structures stored thereon.

In some embodiments, the different components, modules, engines, and services described in the present disclosure may be implemented as objects or processes that execute on a computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method performed by a control system, the method comprising:
   detecting one or more source wireless devices configured to perform short-range wireless communications;
   detecting one or more destination wireless devices that are devices configured to perform short-range wireless communications and that are within range of the one or more source wireless devices for short-range wireless communications with the one or more source wireless devices;
   determining one or more short-range wireless connection priorities for each possible short-range wireless communication pairing between each of the one or more source wireless devices and each of the one or more destination wireless devices based on one or more of the following:
      relationships between device types of the one or more source wireless devices and device types of the one or more destination devices with respect to how the device types of the one or more source wireless devices and the one or more destination wireless devices affect functionality of the one or more source wireless devices and the one or more destination wireless devices, wherein short-range wireless communication pairings are prioritized based on how the relationships between the device types of the one or more source wireless devices and the one or more destination wireless devices relate to possible interactions of the one or more source wireless devices with the one or more destination wireless devices according to functionality specific to different device types;
      relationships between operation modes of the one or more source wireless devices and operation modes of the one or more destination devices, wherein short-range wireless communication pairings are prioritized based on how the relationships between the operation modes of the one or more source wireless devices and the one or more destination wireless devices relate to possible interactions of the one or more source wireless devices with the one or more destination wireless devices according to functionality specific to different operation modes; and
      relationships between user ownership of the one or more source wireless devices and ownership of the one or more destination wireless devices, wherein short-range wireless communication pairings between wireless devices owned by a same user are prioritized over short-range wireless communication pairings between wireless devices owned by different users; and
   managing short-range wireless communication pairings between the one or more source wireless devices and the one or more destination wireless devices based on the short-range wireless communication connection priorities.

2. The method of claim 1, wherein the device types include one or more of the following: a smartphone type, a tablet computer type, a keyboard type, a mouse type, a music player type, a video player type, a desktop computer type, an automobile control module type, a speaker type, and a headphones type.

3. The method of claim 1, wherein the operation modes include one or more of the following: a standby mode, an audio transmitting mode, an audio receiving mode, and a phone call mode.

4. The method of claim 1, wherein the one or more source devices include a first smartphone and a second smartphone and the one or more destination devices includes an automobile control module and wherein determining the one or more short-range wireless connection priorities includes prioritizing pairing the first smartphone with the automobile control module over pairing the second smartphone with the automobile control module based on the first smartphone and the automobile control module being in a phone call mode and based on the second smartphone not being in a phone call mode.

5. The method of claim 1, wherein the one or more source devices include a first smartphone and a second smartphone and the one or more destination devices includes an automobile control module and wherein determining the one or more short-range wireless connection priorities includes prioritizing pairing the first smartphone with the automobile control module over pairing the second smartphone with the automobile control module based on the first smartphone being in an audio transmitting mode, the automobile control module being in an audio receiving mode, and the second smartphone being in a standby mode.

6. The method of claim 1, wherein the one or more source devices include a first smartphone and a second smartphone and the one or more destination devices includes an automobile control module and wherein determining the one or more short-range wireless connection priorities includes prioritizing pairing the first smartphone with the automobile control module over pairing the second smartphone with the automobile control module based on the first smartphone and the automobile control module being owned by a first entity and based on the second smartphone being owned by a second entity.

7. The method of claim 1, wherein determining the one or more short-range wireless communication connection priorities includes determining one or more of the following: one or more applications being run on one or more of the one or more source wireless devices and one or more applications being run on one or more of the one or more destination wireless devices.

8. The method of claim 1, wherein determining the one or more short-range wireless communication connection priorities is further based on distances between one or more source wireless devices and one or more destination wireless devices.

9. The method of claim 8, further comprising determining the distances based on received signal strengths.

10. The method of claim 1, wherein the short-range wireless communications include Bluetooth communications.

11. A system comprising:
   one or more non-transitory computer-readable storage media including instructions stored thereon; and
   one or more processors communicatively coupled to the one or more non-transitory computer-readable storage media and configured to, in response to executing the instructions, cause the system to perform operations, the operations comprising:
- detecting one or more source wireless devices configured to perform short-range wireless communications;
- detecting one or more destination wireless devices that are devices configured to perform short-range wireless communications and that are within range of the one or more source wireless devices for short-range wireless communications with the one or more source wireless devices;
- determining one or more short-range wireless connection priorities for each possible short-range wireless communication pairing between each of the one or more source wireless devices and each of the one or more destination wireless devices based on relationships between operation modes of the one or more source wireless devices and operation modes of the one or more destination devices, wherein short-range wireless communication pairings are prioritized based on how the relationships between the operation modes of the one or more source wireless devices and the one or more destination wireless devices relate to possible interactions of the one or more source wireless devices with the one or more destination wireless devices according to functionality specific to different operation modes; and
- managing short-range wireless communication pairings between the one or more source wireless devices and the one or more destination wireless devices based on the short-range wireless communication connection priorities.

12. The system of claim 11, wherein the operation modes include one or more of the following: a standby mode, an audio transmitting mode, an audio receiving mode, and a phone call mode.

13. The system of claim 11, wherein the one or more source devices include a first smartphone and a second smartphone and the one or more destination devices includes an automobile control module and wherein determining the one or more short-range wireless connection priorities includes prioritizing pairing the first smartphone with the automobile control module over pairing the second smartphone with the automobile control module based on the first smartphone and the automobile control module being in a phone call mode and based on the second smartphone not being in a phone call mode.

14. The system of claim 11, wherein the one or more source devices include a first smartphone and a second smartphone and the one or more destination devices includes an automobile control module and wherein determining the one or more short-range wireless connection priorities includes prioritizing pairing the first smartphone with the automobile control module over pairing the second smartphone with the automobile control module based on the first smartphone being in an audio transmitting mode, the automobile control module being in an audio receiving mode, and the second smartphone being in a standby mode.

15. The system of claim 11, wherein determining the operation modes includes determining one or more of the following: one or more applications being run on one or more of the one or more source wireless devices and one or more applications being run on one or more of the one or more destination wireless devices.

16. The system of claim 11, wherein determining the one or more short-range wireless communication connection priorities is further based on distances between one or more source wireless devices and one or more destination wireless devices.

17. The system of claim 16, wherein the operations further comprise determining the distances based on received signal strengths.

18. The system of claim 11, wherein the operations further comprise determining the one or more short-range wireless connection priorities based on one or more of the following:
- relationships between device types of the one or more source wireless devices and device types of the one or more destination devices with respect to how the device types of the one or more source wireless devices and the one or more destination wireless devices affect functionality of the one or more source wireless devices and the one or more destination wireless devices, wherein short-range wireless communication pairings are prioritized based on how the relationships between the device types of the one or more source wireless devices and the one or more destination wireless devices relate to possible interactions of the one or more source wireless devices with the one or more destination wireless devices according to functionality specific to different device types; and
- relationships between user ownership of the one or more source wireless devices and ownership of the one or more destination wireless devices, wherein short-range wireless communication pairings between wireless devices owned by a same user are prioritized over short-range wireless communication pairings between wireless devices owned by different users.

19. One or more non-transitory computer-readable storage media including instructions stored thereon that cause a system to perform operations in response to the instructions being executed by one or more processors, the operations comprising:
- detecting one or more source wireless devices configured to perform short-range wireless communications;
- detecting one or more destination wireless devices that are devices configured to perform short-range wireless communications and that are within range of the one or more source wireless devices for short-range wireless communications with the one or more source wireless devices;
- determining one or more short-range wireless connection priorities for each possible short-range wireless communication pairing between each of the one or more source wireless devices and each of the one or more destination wireless devices based on one or more of the following:
  - relationships between device types of the one or more source wireless devices and device types of the one or more destination devices with respect to how the device types of the one or more source wireless devices and the one or more destination wireless devices affect functionality of the one or more source wireless devices and the one or more destination wireless devices, wherein short-range wireless communication pairings are prioritized based on how the relationships between the device types of the one or more source wireless devices and the one or more destination wireless devices relate to possible interactions of the one or more source wireless devices with the one or more destination wireless devices according to functionality specific to different device types;

relationships between operation modes of the one or more source wireless devices and operation modes of the one or more destination devices, wherein short-range wireless communication pairings are prioritized based on how the relationships between the operation modes of the one or more source wireless devices and the one or more destination wireless devices relate to possible interactions of the one or more source wireless devices with the one or more destination wireless devices according to functionality specific to different operation modes; and relationships between user ownership of the one or more source wireless devices and ownership of the one or more destination wireless devices, wherein short-range wireless communication pairings between wireless devices owned by a same user are prioritized over short-range wireless communication pairings between wireless devices owned by different users; and managing short-range wireless communication pairings between the one or more source wireless devices and the one or more destination wireless devices based on the short-range wireless communication connection priorities.

20. The one or more non-transitory computer-readable storage media of claim 19, wherein determining the one or more short-range wireless communication connection priorities includes determining one or more of the following: one or more applications being run on one or more of the one or more source wireless devices and one or more applications being run on one or more of the one or more destination wireless devices.

\* \* \* \* \*

UNITED STATES PATENT AND TRADEMARK OFFICE
CERTIFICATE OF CORRECTION

PATENT NO. : 9,992,614 B2  
APPLICATION NO. : 15/238519  
DATED : June 5, 2018  
INVENTOR(S) : Jennifer T. Brenner et al.

Page 1 of 1

It is certified that error appears in the above-identified patent and that said Letters Patent is hereby corrected as shown below:

On the Title Page

Under "(*) Notice:", Line 3, after "0 days." delete "days.".

Signed and Sealed this
Twenty-first Day of May, 2019

Andrei Iancu
*Director of the United States Patent and Trademark Office*